US012689117B2

United States Patent
(12) United States Patent
Anguera et al.

(10) Patent No.: US 12,689,117 B2
(45) Date of Patent: Jul. 21, 2026

(54) LOOP BOOSTER FOR SMALL IoT DEVICES

(71) Applicant: IGNION, S.L., Barcelona (ES)

(72) Inventors: Jaume Anguera, Vinaros (ES); Aurora Andújar, Barcelona (ES); José Luis Pina, Barcelona (ES)

(73) Assignee: IGNION, S.L., Barcelona (ES)

( * ) Notice: Subject to any disclaimer, the term of this patent is extended or adjusted under 35 U.S.C. 154(b) by 185 days.

(21) Appl. No.: 18/315,206

(22) Filed: May 10, 2023

(65) Prior Publication Data

US 2023/0369753 A1 Nov. 16, 2023

Related U.S. Application Data

(60) Provisional application No. 63/339,992, filed on May 10, 2022.

(30) Foreign Application Priority Data

May 10, 2022 (EP) .................................... 22172527

(51) Int. Cl.
*H01Q 1/38* (2006.01)
*H01Q 1/48* (2006.01)
*H01Q 9/04* (2006.01)

(52) U.S. Cl.
CPC ................. *H01Q 1/38* (2013.01); *H01Q 1/48* (2013.01); *H01Q 9/0421* (2013.01)

(58) Field of Classification Search
CPC .......... H01Q 1/38; H01Q 1/48; H01Q 9/0421; H01Q 5/335; H01Q 9/42; H01Q 1/243
See application file for complete search history.

(56) References Cited

U.S. PATENT DOCUMENTS 7,119,749 B2 10/2006 Miyata et al.
2004/0108957 A1* 6/2004 Umehara .............. H01Q 5/385 343/702

(Continued)

FOREIGN PATENT DOCUMENTS

WO 2010/015364 A2 2/2010
WO 2010/015365 A2 2/2010

(Continued)

OTHER PUBLICATIONS

Fredrik Persson, et al. "Design of Antennas for Handheld DVB-H Terminals", Master's Thesis, Lund University, Department of Electroscience, Jan. 2026, pp. 30-31.

(Continued)

*Primary Examiner* — Dimary S Lopez Cruz
*Assistant Examiner* — Michael M Bouizza
(74) *Attorney, Agent, or Firm* — Edell, Shapiro & Finnan, LLC

(57) ABSTRACT

A wireless device operates in at least one frequency region and/or frequency band and comprises a radiating system that includes a radiating structure comprising a ground plane layer having a clearance area at a corner of a ground plane rectangle that encompasses the ground plane layer, an antenna element located in the clearance area, and two connections of the antenna element to the ground plane layer. The radiating system further comprises a radiofrequency system comprising a matching network and/or an electronic circuit. One of the antenna element to ground plane layer connections is connected to an input/output port of the radiating system and a second connection connects the antenna element to the ground plane layer through a short-circuit or an electronic circuit.

18 Claims, 12 Drawing Sheets

(56) References Cited

U.S. PATENT DOCUMENTS

| | | | | |
|---|---|---|---|---|
| 2010/0321250 | A1* | 12/2010 | Sorvala | H01Q 1/2283 343/700 MS |
| 2013/0120198 | A1* | 5/2013 | Maeda | H01Q 9/42 343/700 MS |
| 2014/0062815 | A1* | 3/2014 | Tsai | H01Q 9/42 343/745 |
| 2016/0233584 | A1* | 8/2016 | Anguera Pros | H01Q 5/35 |
| 2020/0176855 | A1* | 6/2020 | Anguera | H01Q 5/378 |
| 2020/0381832 | A1* | 12/2020 | Anguera Pros | H01Q 9/0442 |

FOREIGN PATENT DOCUMENTS

| | | | |
|---|---|---|---|
| WO | 2014/012842 | A1 | 1/2014 |
| WO | 2016/012507 | A1 | 1/2016 |
| WO | 2019/008171 | A1 | 1/2019 |
| WO | 2020/120589 | A2 | 6/2020 |

OTHER PUBLICATIONS

Samantha Caporal del Barrio, et al. "Tunable Handset Antenna: Enhancing Efficiency on TV White Spaces", IEEE Transactions on Antennas and Propagation, vol. 65, No. 4, pp. 2106-2111, Apr. 2017.

Kwai-Man Luk, et al. "The Magnetoelectric Dipole V A Wideband Antenna for Base Stations in Mobile Communications", Proceedings of the IEEE, vol. 100, n. 7, pp. 2297-2307, Jul. 2012.

* cited by examiner

| Component | Value | Part Number |
|---|---|---|
| $Z_1$ | 91 nH | LQW18AN91NG80 |
| $Z_2$ | 75 nH | LQW18AN75NG00 |
| $Z_3$ | 75nH | LQW18AN75NG00 |

| Port | Component | Value | Part Number |
|---|---|---|---|
| 501 | $Z_{71}$ | 1.9 pF | GJM1555C1H1R9WB01 |
|  | $Z_{72}$ | 33 pF | GJM1555C1H330FB01 |
| 502 | $Z_{73}$ | 0 Ohms | -- |

| Port | Component | Value | Part Number |
|---|---|---|---|
| 501 | $Z_{111}$ | 5.7 pF | GJM1555C1H5R7WB01 |
| | $Z_{112}$ | 5.7 pF | GJM1555C1H5R7WB01 |
| | $Z_{113}$ | 5.6 pF | GJM1555C1H5R6WB01 |
| | $Z_{114}$ | 30 pF | GJM1555C1H300FB01 |
| 502 | $Z_{115}$ | 0 Ohms | -- |

LOOP BOOSTER FOR SMALL IoT DEVICES

CROSS REFERENCE TO RELATED APPLICATIONS

This application claims priority under 35 U.S.C. § 119(e) from U.S. Provisional Patent Application Ser. No. 63/339,992, filed May 10, 2022, claims priority under 35 U.S.C. § 119 to Application No. EP 22172527.8 filed on May 10, 2022, the entire contents of which are hereby incorporated by reference.

TECHNICAL FIELD

The present invention relates to the field of wireless devices operating in at least a frequency region and/or frequency band.

BACKGROUND

Wireless devices able to operate in at least a frequency region and/or frequency band including non-resonant antenna elements provide a non-customized solution that can be allocated in small spaces in a PCB. There exists in literature non-resonant antenna solutions, like for example WO2010/015365 A2, WO2010/015364 A2, WO2020/120589A1, and WO2019/008171A1, which comprise radiation boosters as described in, for example, the patent document WO2010/015365 A2, and which normally feature capacitive impedances at the operating frequencies, those capacitive impedances being very capacitive in some cases, particularly at low-frequencies. It has been found that when matching such a solution with a series inductance for compensating such high capacitance requires an inductance with a very high value, which normally features high losses. This results in losses of the matching network and, therefore, in antenna efficiency losses for the whole radiating system. It is also worth noticing that some of those non-resonant solutions found in prior-art are magnetic solutions featuring an inductive input impedance, so that they can already be matched with a matching network comprising capacitors. But these magnetic solutions cannot be implemented in an efficient way at corner positions of the ground plane layer, conditioning the position needed in the PCB for implementing the solution.

Additionally, when the ground plane layer of those non-resonant solutions features small dimensions, the efficiency of the radiating system is reduced with respect to a radiating structure or system of optimum bigger dimensions. Then, having a radiating system or wireless device of improved antenna efficiency is an advantageous solution. So, in the context of the present invention, a radiating system comprised in a wireless device featuring better efficiencies than the ones obtained before putting into practice the invention is provided and disclosed.

SUMMARY

The present invention relates to a wireless device operating in at least a frequency region and/or frequency band comprising a radiating system that comprises a radiating structure comprising an antenna element, being in some examples a booster element or radiation booster, and at least a ground plane layer, the radiating system also comprising at least one feeding or input/output port, and a radiofrequency system that comprises a matching network and/or an electronic circuit. In the context of this invention, a radiation booster or booster element refers to a radiation booster described and defined in the patent documents WO2010/015365 A2, WO2014/012842 A1 and WO2016/012507 A1, incorporated by reference herein. The antenna element is in some embodiments an electrically-small antenna and, it is in some examples, a strip line or even a feeding line. A radiation booster typically features a maximum size smaller than the free-space wavelength over 20 at the smallest frequency of a first frequency region of operation and, according to this invention, an electrically-small antenna features a maximum size between the free-space wavelength over 20 and the free-space wavelength over 5, also at the smallest frequency of a first frequency region of operation.

A wireless device or a radiating system according to this invention comprises a radiating structure comprising a ground plane layer that comprises a clearance area, area within the ground plane layer without ground, at a corner of a ground plane rectangle, the ground plane rectangle being the minimum-sized rectangle that encompasses a ground plane layer of the radiating structure; the radiating structure also comprising an antenna element, placed in the clearance area and, advantageously in some embodiments, arranged along an edge or substantially along an edge of the radiating structure; and a first and a second connections of the antenna element to the ground plane layer or internal ports, the connections or internal ports preferably being, in some embodiments, at opposite corners of the clearance area; the radiating system also comprising a radiofrequency system that comprises a matching network. In some embodiments, the radiating structure also comprises at least a conductive element connected to the antenna element, such that the connection of the antenna element to the ground plane layer or the internal port is defined between the conductive element and the ground plane layer. In some embodiments, the conductive element is a conductive strip or alike. In a radiating system according to the present invention, one of the connections or internal ports is connected to a first feeding or input/output port of the radiating system, and a second connection or internal port is a non-driven or passive internal port, so not connected to a feeding or input/output port. The matching network comprised in the radiofrequency system provides impedance matching at a feeding or input/output port of the radiating system. In some embodiments, the second connection or non-driven port connects the antenna element to the ground plane layer directly, by means of a short-circuit, or said in other words, the second internal port is connected to a short-circuit. In other embodiments, the second connection connects the antenna element and the ground plane layer by means of an electronic circuit, or said in other words, the second connection or port, which is a non-driven port, is connected to an electronic circuit. The electronic circuit comprises at least one circuit component, such as for instance a passive component, as for example an inductor or a capacitor, or in some embodiments, an active component, as for example a switch or a tunable component, a diode, a transistor, etc., or a transmission line or any other circuit component. Connecting the antenna element to the ground plane layer through a second non-driven connection or internal port results in an inductive input impedance instead of having a capacitive input impedance at a feeding port. Such an inductive input impedance can be modified to obtain a matched radiating system, by using a matching network comprising capacitors, preferably being high-Q capacitors, which feature low losses (or high Qs) particularly at low frequencies, which results in less matching network losses and better radiating system efficiencies. So, one of the advantages of the present invention is the improvement in antenna efficiency with respect to prior-art radiating systems. Then, this invention is particularly advantageous for radiating structures and systems featuring high-capacitive input impedances, which can particularly happen at low frequencies, as for example below 1 GHz, for a radiating system related to the present invention.

A matching network comprised in the radiofrequency system of a radiating system related to the present invention comprises at least a series capacitor connected between them and connected to the antenna element, the matching network used to match a feeding or input/output port of the radiating system. In some embodiments, this matching network comprises a first series capacitor connected to the antenna element and a parallel capacitor connected to the first series capacitor. In other embodiments, at least two series capacitors connected to the antenna element are included in the matching network, and in some of these last embodiments a parallel capacitor is comprised at the end of the matching network. Using more than one series capacitors at the beginning of the matching network allows to use capacitors of higher values, with better tolerances, and therefore more stable input reflection coefficients are obtained, guaranteeing a matching performance, as for example, obtaining an input reflection coefficient below −6 dB. In some embodiments, the ground plane layer comprised in the radiating structure advantageously features small dimensions in terms of the operating wavelength, the ground plane layer length and/or the width featuring a value smaller than 0.35*wavelength, the wavelength being the free-space wavelength corresponding to the smallest frequency of a first frequency region of operation of the device or radiating system. In some embodiments, the ground plane length and/or width features a value smaller than 0.3*wavelength, or even smaller than 0.2*wavelength or 0.1*wavelength. Also, some embodiments are characterized by including a ground plane layer of area smaller than 0.1*wavelength$^2$ or smaller than 0.09*wavelength$^2$, or in some other embodiments, smaller than 0.07*wavelength$^2$, or smaller than 0.05*wavelength$^2$ or, in some embodiments, such ground plane area being even smaller than 0.01*wavelength$^2$.

BRIEF DESCRIPTION OF THE DRAWINGS

The mentioned and further features and advantages of the invention become apparent in view of the detailed description which follows with some examples of the invention, referenced by means of the accompanying drawings, given for purposes of illustration only and in no way meant as a definition of the limits of the invention.

FIG. 12 also provides a tolerance analysis to see if a < or =−6 dB criteria for the input reflection coefficient is accomplished taking into account the tolerances of the matching network components.

DETAILED DESCRIPTION

The mentioned and further features and advantages of the invention become apparent in view of the detailed description, which follows with some examples of the invention, referenced by means of the accompanying drawings, given for purposes of illustration only and in no way meant as a definition of the limits of the invention.

Figure 1:
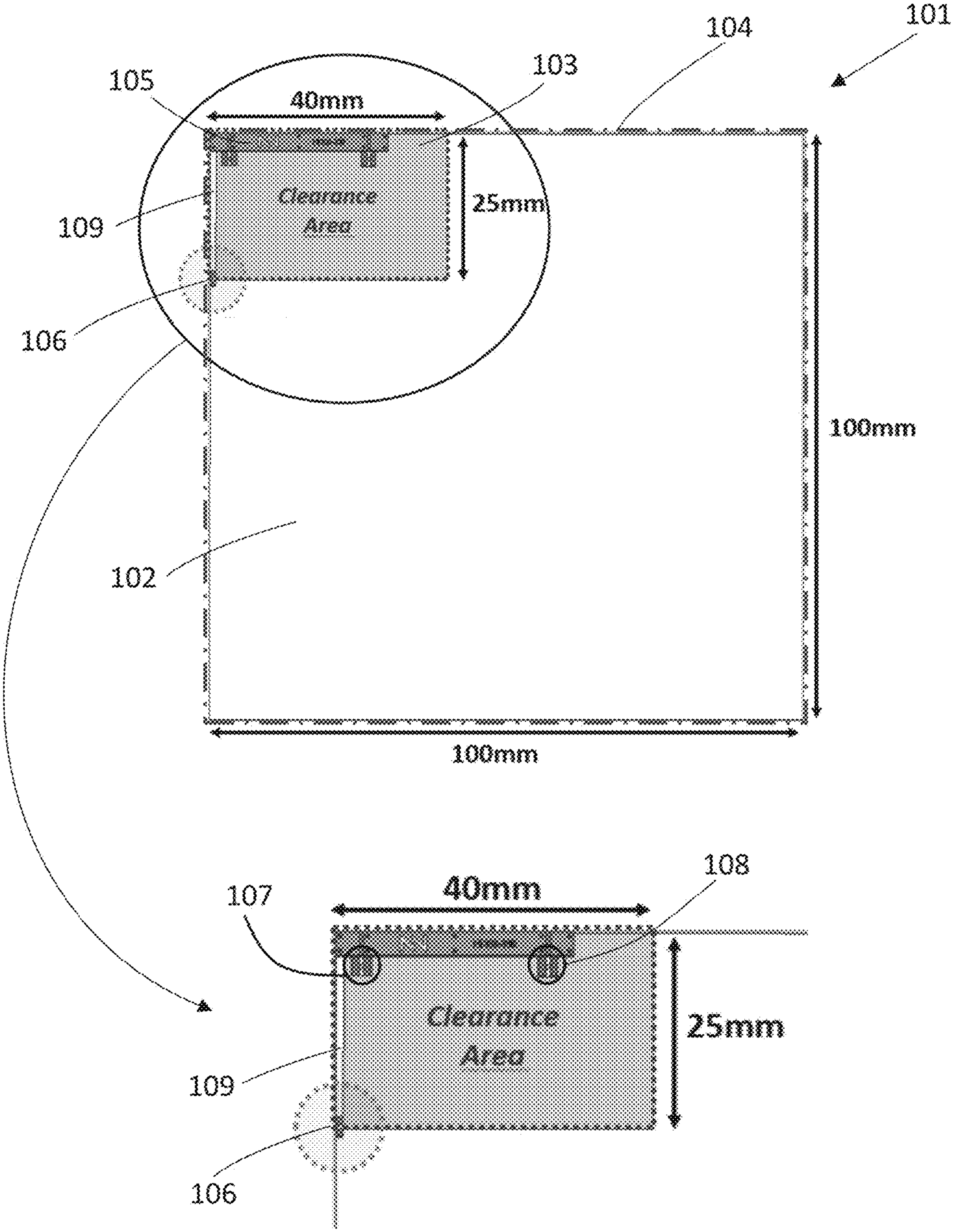
FIG.1 PRIOR ART
FIG. 1 illustrates a prior-art radiating system.

FIG. 1 shows a radiating system related to prior-art. This radiating system 101 comprises a radiating structure comprising a ground plane layer 102 that comprises a clearance area 103 at a corner of a ground plane rectangle 104 that encompasses the ground plane layer; the radiating structure also comprising an antenna element 105, placed in the clearance area and arranged along an edge or substantially along an edge of the clearance area; and one internal port 106 or connection of the antenna element to the ground plane layer through a conductive strip 109; the radiating system also comprising a radiofrequency system that comprises a matching network, the matching network being connected to the internal port 106. Additionally, the connection or internal port 106 is connected to a feeding or input/output port of the radiating system. The dimensions of the clearance area and the ground plane layer of the particular example provided in FIG. 1 are included in the figure. And the antenna element comprised in this specific embodiment is a modular antenna element, more particularly a TRIO mXTEND™ component (https://ignion.io/product/trio-mxtend/), which features a length of 30 mm by a width of 3 mm by a height of 1 mm.

Figure 2:
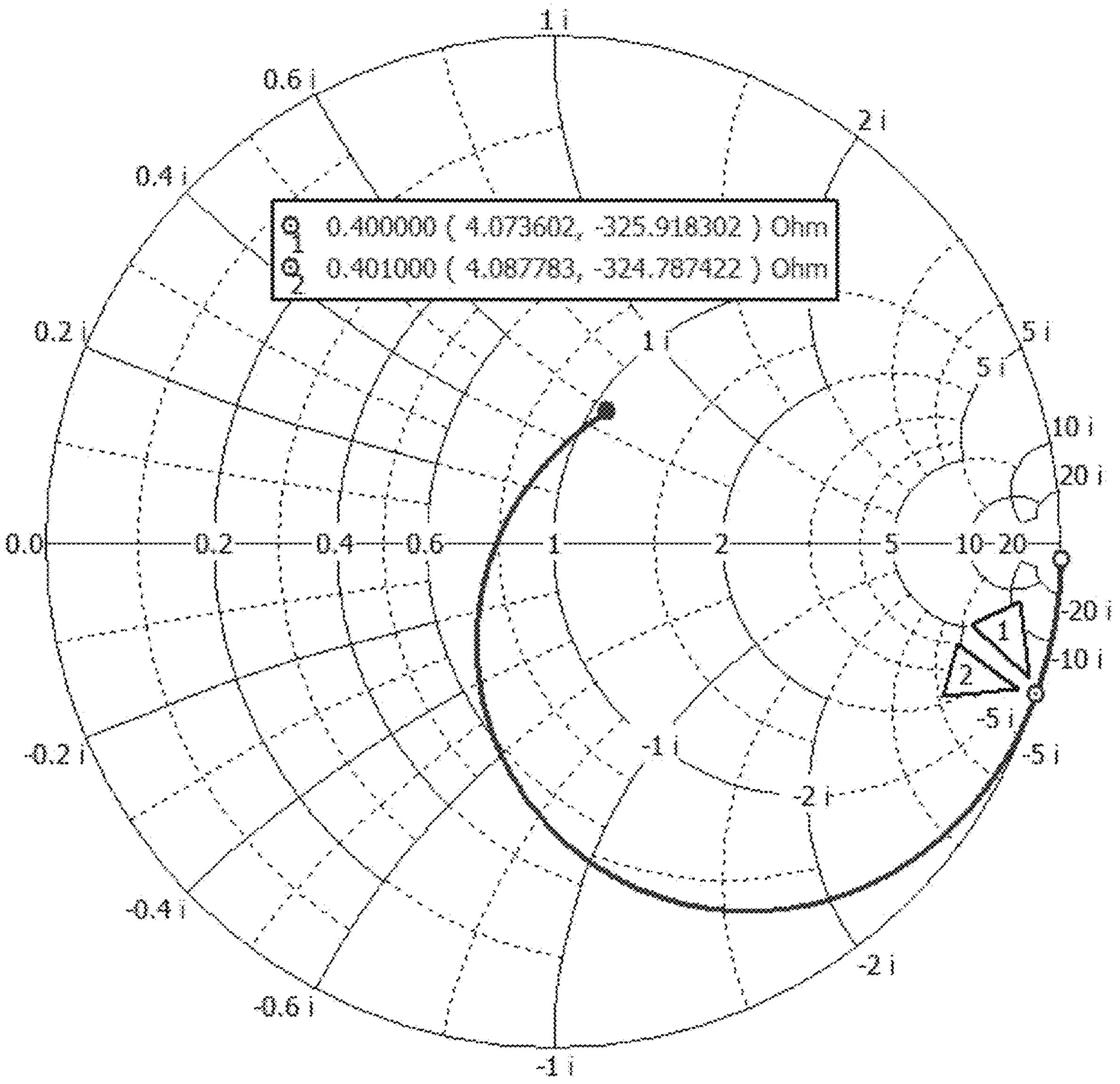
FIG. 2 shows an input reflection coefficient related to the radiating system provided in FIG. 1. Two markers with the impedance values obtained at the limit frequencies of the operation frequency band are included.
Figure 3:
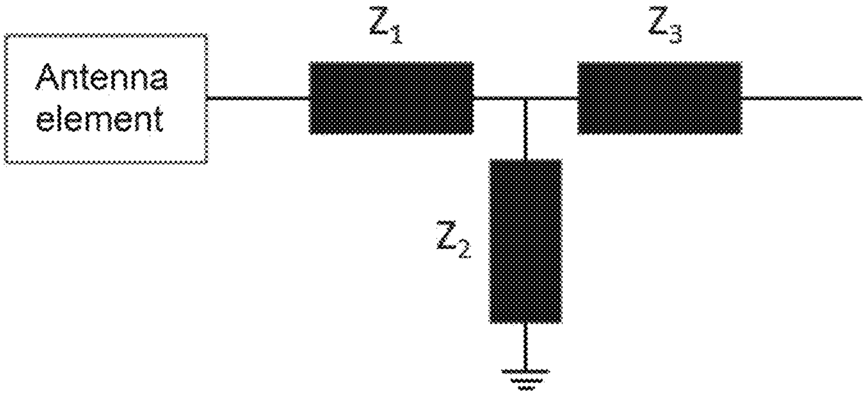
FIG. 3 illustrates at the top a matching network topology used for matching the prior-art embodiment provided in FIG. 1 and, at the bottom, the values and part numbers of the components used for matching the radiating system.
Figure 4:
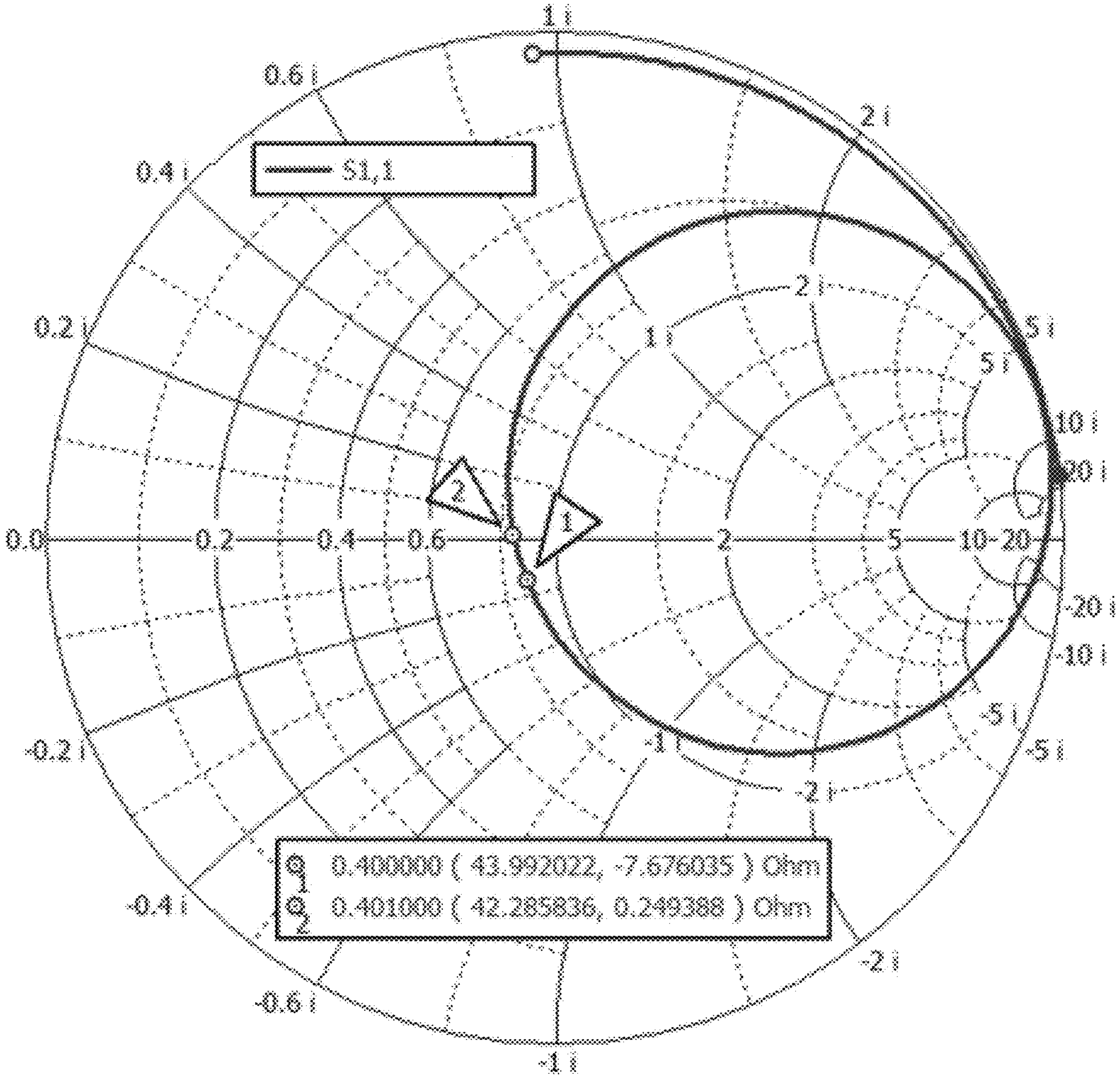
FIG. 4 shows the input reflection coefficient obtained after matching the prior-art embodiment from FIG. 1 with the matching network provided in FIG. 3. Two markers with the impedance values obtained at the limit frequencies of the operation frequency band are included.

The FIG. 2 provides the input reflection coefficient obtained at the internal port 106 when it is not connected to a matching network. The input reflection coefficient for the frequency range going from 0.1 GHz to 1 GHz is plotted. For the specific case of the modular antenna element comprised in the radiating system embodiment from FIG. 1, each of the antenna element ports 107 and 108 is connected to a 0 Ohms resistance that allow to interconnect the different sections or parts of the modular antenna element. Two markers with the impedance values obtained at the limit frequencies of the operation frequency band of interest are included. The input impedance obtained in the frequency band, going from 400 MHz to 401 MHz, features a capacitive reactance, being particularly high at those low frequencies. A matching network comprised in the radiofrequency system of the radiating system from FIG. 1 and connected to the internal port 106 is provided in FIG. 3, the matching network topology, the components values and their corresponding part numbers are provided. A very high value series inductance—91 nH—is needed at the beginning of the matching network to compensate the very high capacitive reactance of the input impedance obtained at the low frequencies of interest. Two more inductances of also a high value—75 nH—are comprised in the matching network from FIG. 3. Those high-value inductances feature high losses at the mentioned low operation frequencies, which has an impact on the antenna efficiency obtained for the radiating structure. FIG. 4 shows the input reflection coefficient obtained after matching the radiating system from FIG. 1 as described above.

Figure 5:
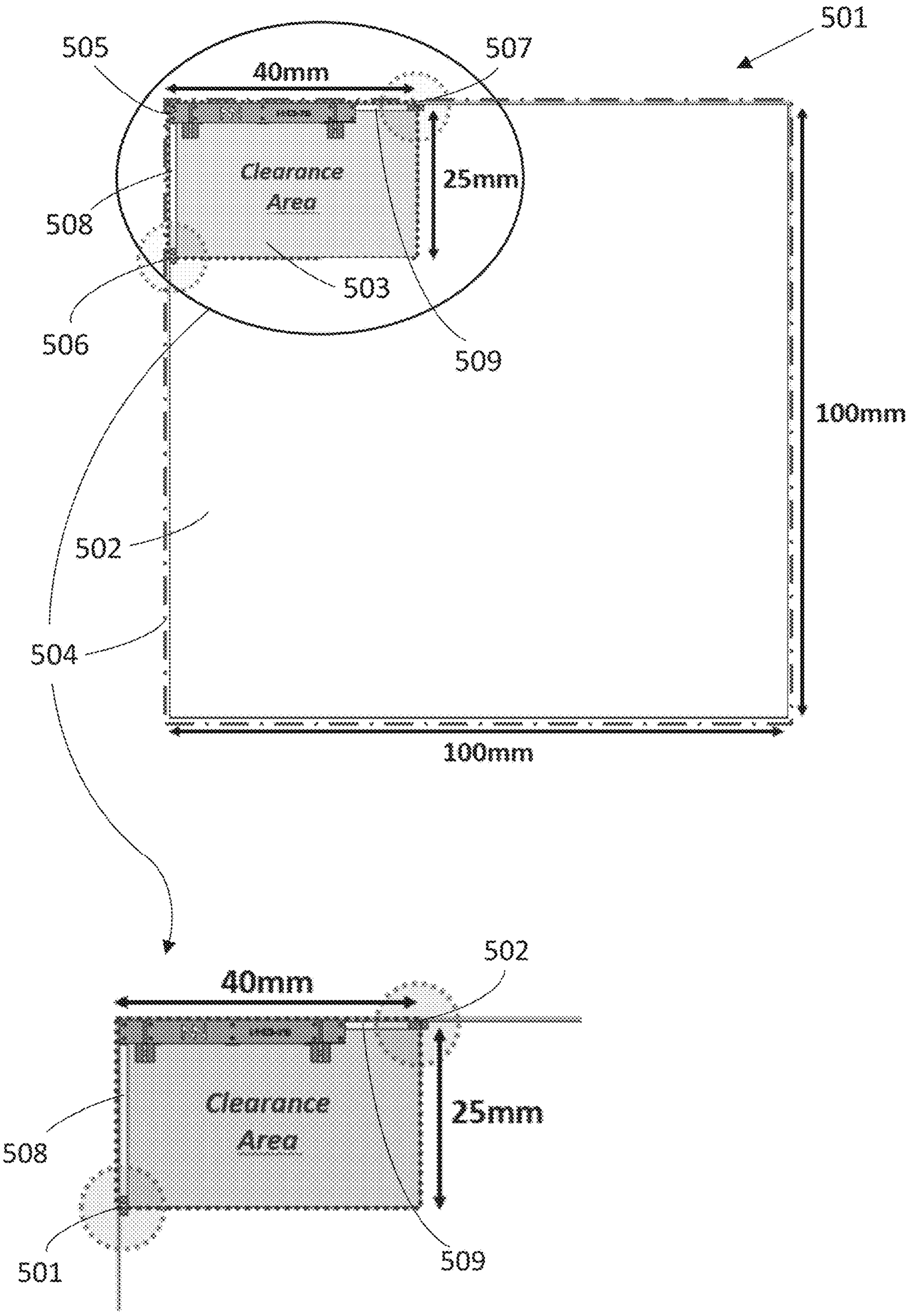
FIG. 5 illustrates an embodiment of a radiating system related to this invention.

FIG. 5 provides a radiating system 501 embodiment related to this invention. This radiating system comprises a radiating structure comprising a ground plane layer 502 that comprises a clearance area 503 at a corner of a ground plane rectangle 504 that encompasses the ground plane layer; the radiating structure also comprising an antenna element 505, placed in the clearance area and arranged along an edge or substantially along an edge of the clearance area; and two connections or internal ports 506, 507 of the antenna element to the ground plane layer through the conductive strips 508, 509, respectively, the connections or internal ports being at opposite corners of the clearance area; the radiating system also comprising a radiofrequency system that comprises a matching network. In this particular example, connection or port 506 is connected to a feeding or input/output port of the radiating system, and connection 507 is connected to a short-circuit that connects the antenna element to the ground plane layer directly. The dimensions of the clearance area are included in the figure, together with the length and width of the ground plane layer. This embodiment operates at around 400 MHz, more concretely in a frequency band going from 400 MHz to 401 MHz, so the ground plane length and width are smaller than 0.2*λ, at 400 MHz, being electrically small with respect to the largest operating wavelength λ. The antenna element, which features a length of 30 mm by a width of 3 mm by a height of 1 mm, is also electrically-small in terms of the wavelength λ, at 400 MHz, more specifically λ over 25 at that frequency.

Figure 6:
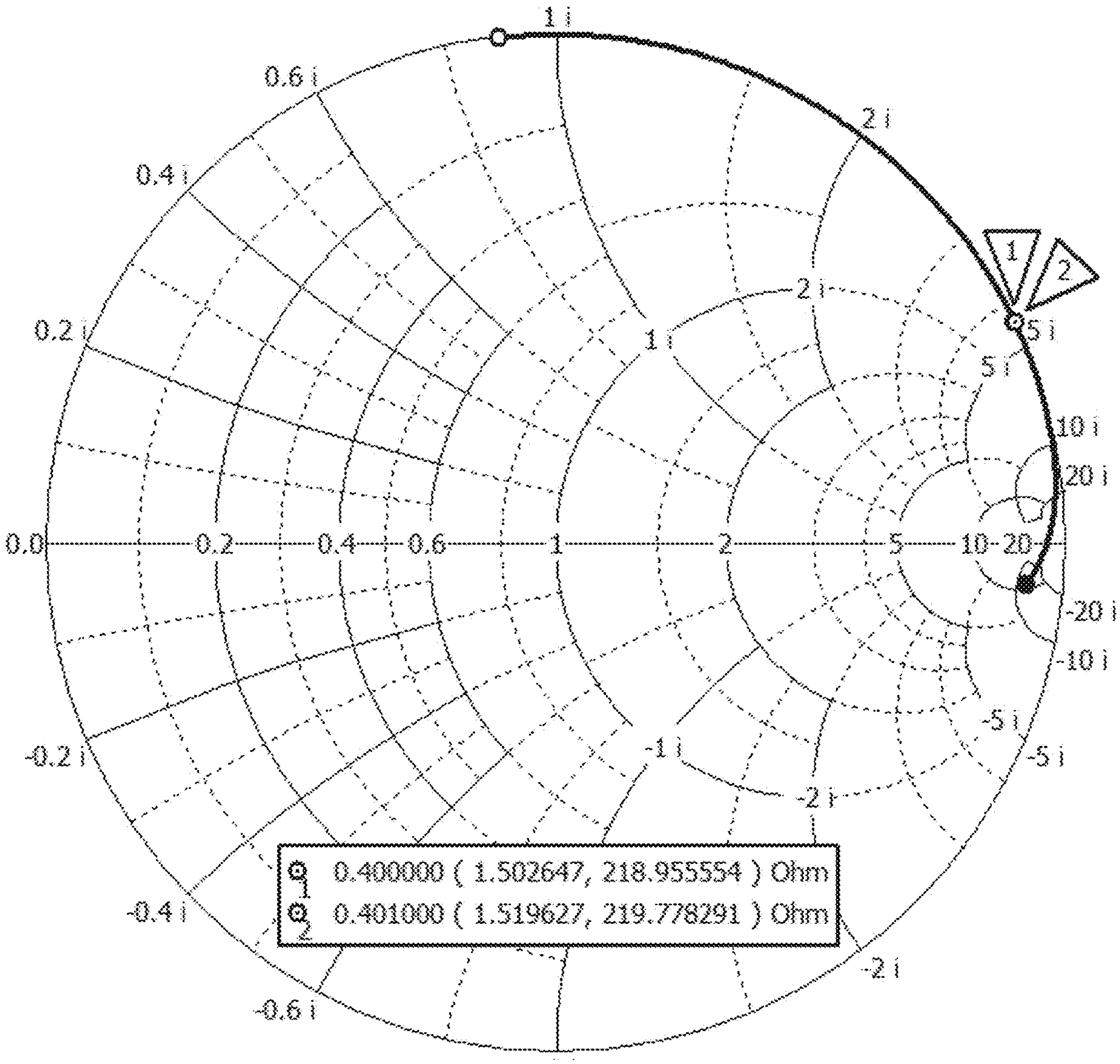
FIG. 6 shows the input reflection coefficient obtained at the feeding port of the embodiment from FIG. 5 when no matching network is used. The feeding port is connected to the connection 501 from FIG. 5. Two markers with the impedance values obtained at the limit frequencies of the operation frequency band are included.

FIG. 6 represents the input reflection coefficient obtained at the internal port 506 of the embodiment illustrated in FIG. 5 when it is not connected to a matching network. As already described along this document, it has been found that the input impedance corresponding to this input reflection coefficient features an inductive reactance at the operation frequencies, within the range from 400 MHz to 401 MHz. This input impedance can be matched with a matching network including at least one series capacitor connected to a final parallel capacitor, like the matching network shown in FIG. 7, which comprises two capacitors. At low frequencies, like the operation frequencies of the embodiment from FIG. 5, around 400 MHz, those capacitors feature less losses or high-quality factors than the inductances needed for matching the prior-art embodiment from FIG. 1, providing a more performant matching network and radiating system. The matching network from FIG. 7 comprises a first series capacitor connected to the antenna element and a parallel capacitor connected to the first series capacitor. More particularly, the values of those capacitors are 1.9 pF for the first series capacitor and 33 pF for the parallel capacitor. Regarding the port 502, a 0 Ohms resistance is connected to it to create a short-circuit between the antenna and the ground plane layer.

Figure 7:
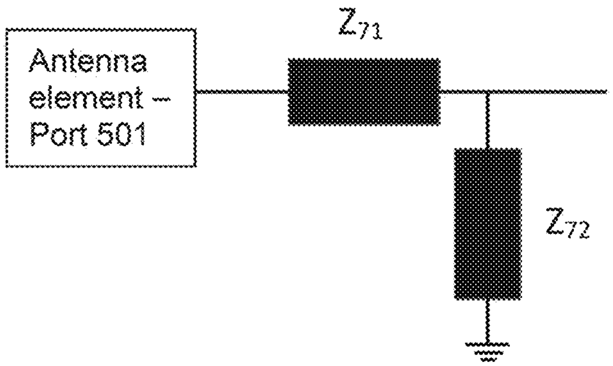
FIG. 7 illustrates at the top a matching network topology used for matching the radiating system embodiment provided in FIG. 5 and, at the bottom, the values and part numbers of the components used for matching the radiating system.
Figure 8:
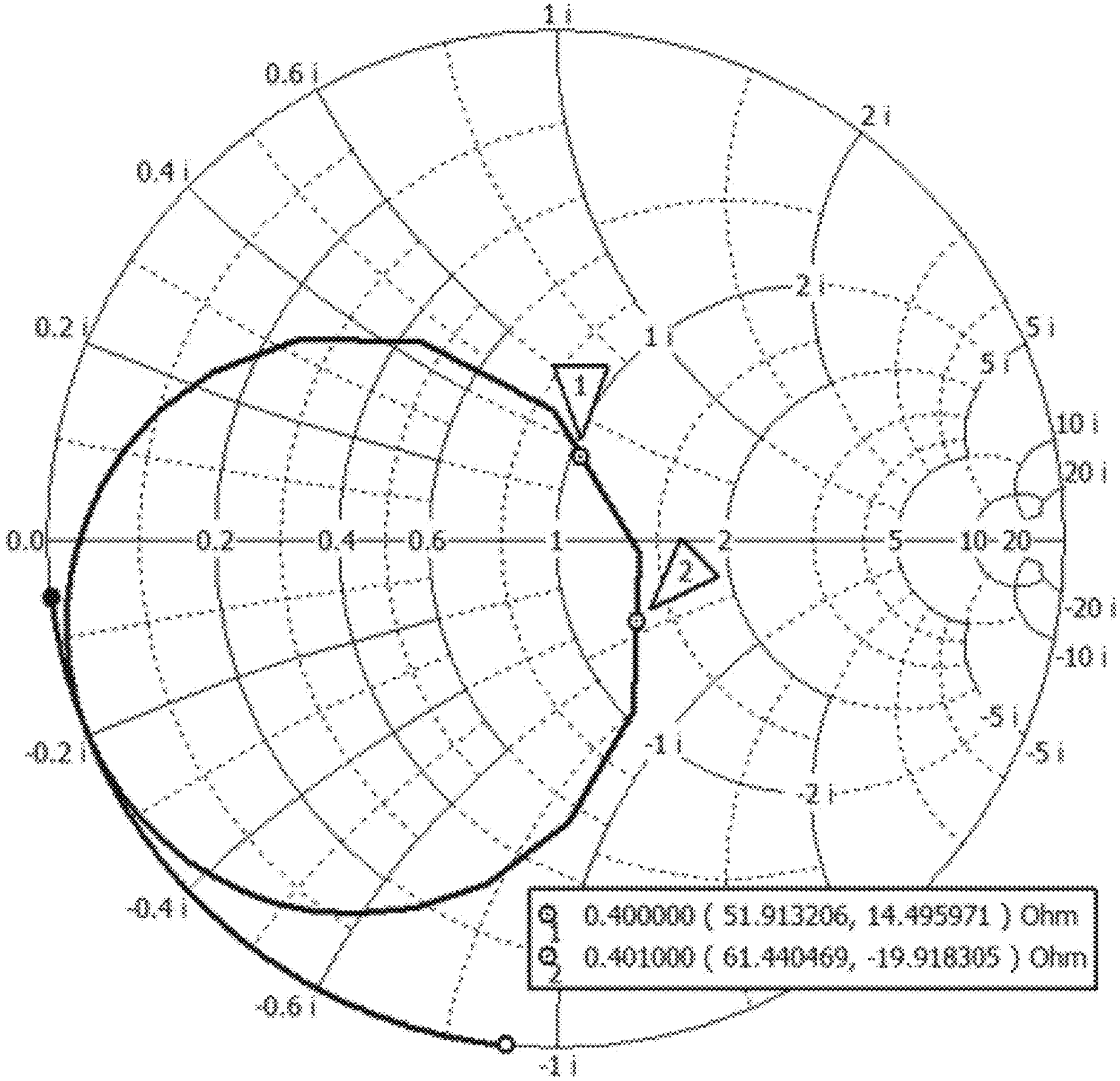
FIG. 8 shows the input reflection coefficient obtained after matching the embodiment from FIG. 5 with the matching network provided in FIG. 7. Two markers with the impedance values obtained at the limit frequencies of the operation frequency band are included.
Figure 9:
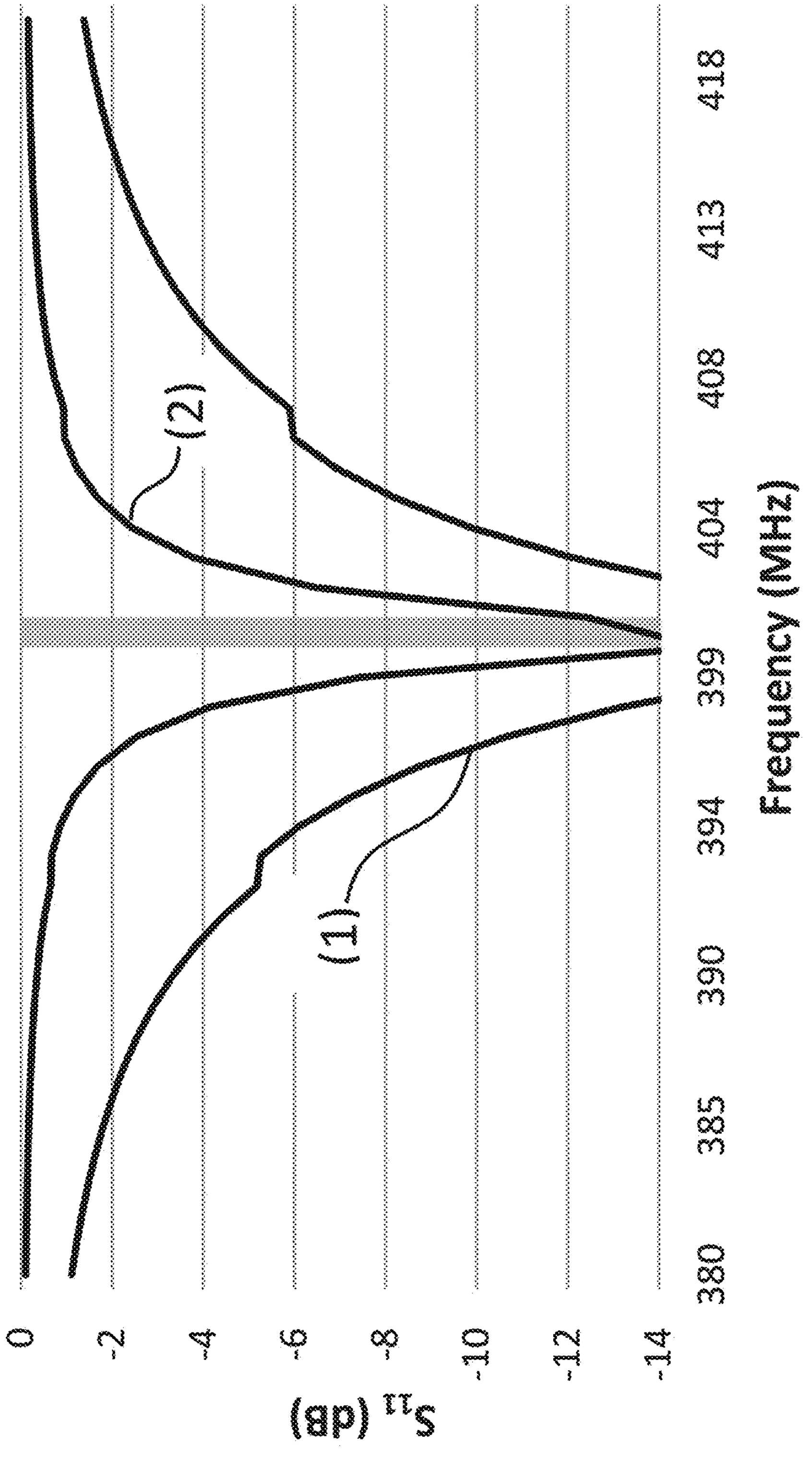
FIG. 9 shows the module of the input reflection coefficient comparison obtained after matching the embodiments from FIG. 1, curve (1), and FIG. 5, curve (2), with the matching networks provided in FIG. 3 and FIG. 7, respectively.
Figure 10:
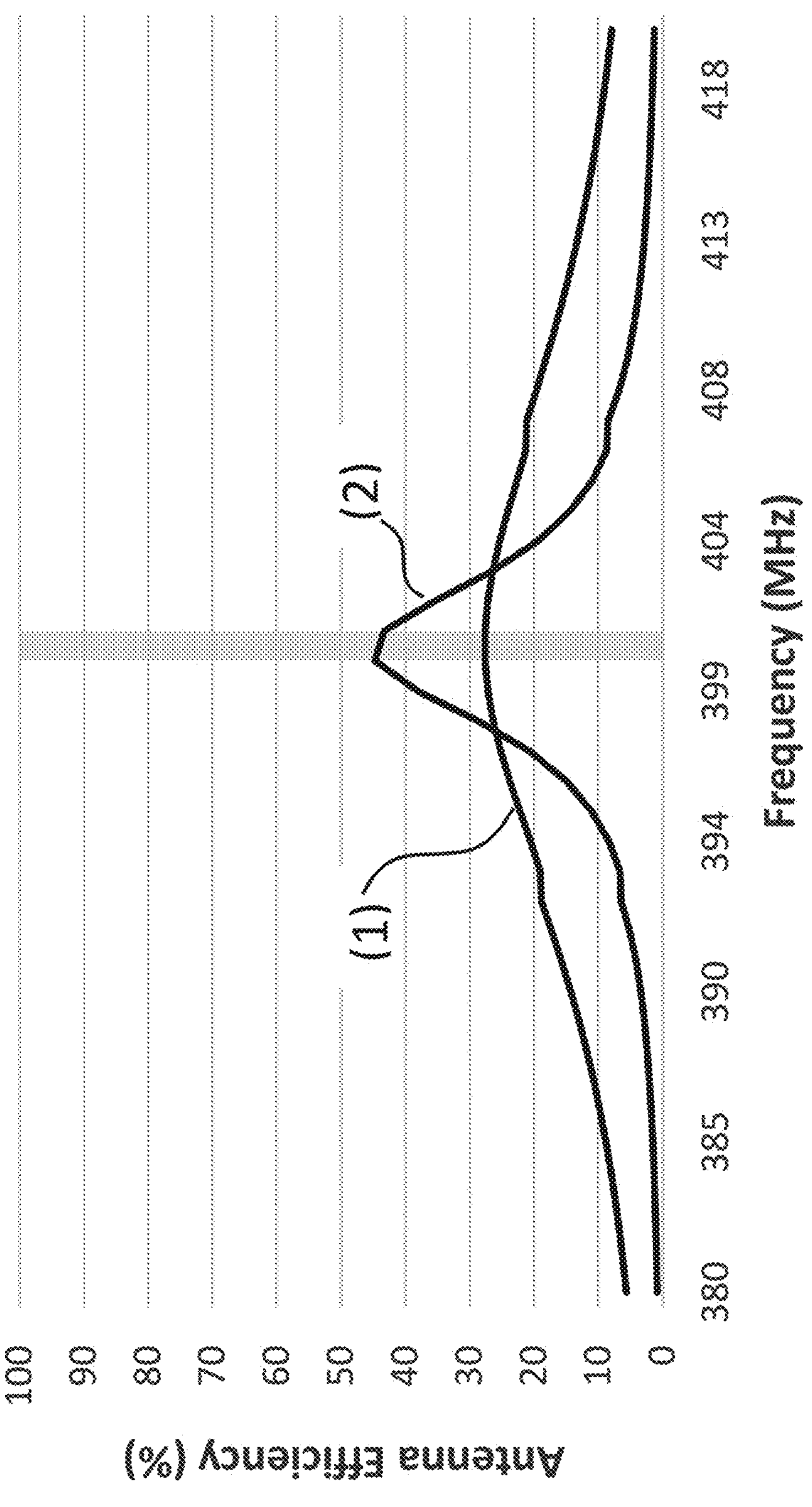
FIG. 10 shows an antenna efficiency comparison obtained for the embodiments from FIG. 1 and FIG. 5 matched with the matching networks provided in FIG. 3 and FIG. 7, respectively.

FIG. 8 provides the input reflection coefficient related to the radiating system from FIG. 5, when matched with the matching network provided in FIG. 7. FIG. 9 shows the module of the input reflection coefficient compared to the module of the input reflection coefficient related to a radiating system from prior-art as the one shown in FIG. 1, when it is matched with the matching network from FIG. 3. The bandwidth obtained for the prior-art embodiment, see curve (1), is wider than the one obtained for the radiating system from FIG. 5, see curve (2), but in both cases, values of the input reflection coefficient below −10 dB are achieved. FIG. 10 provides a comparison of the antenna efficiencies obtained for the prior-art embodiment from FIG. 1 and the embodiment related to the invention provided in FIG. 5, matched with the matching networks provided in FIG. 3 and FIG. 7, respectively. An antenna efficiency improvement is obtained in the operation frequency band, going from 400 MHz to 401 MHz, with around a 15% improvement of the antenna efficiency peak.

Figure 11:
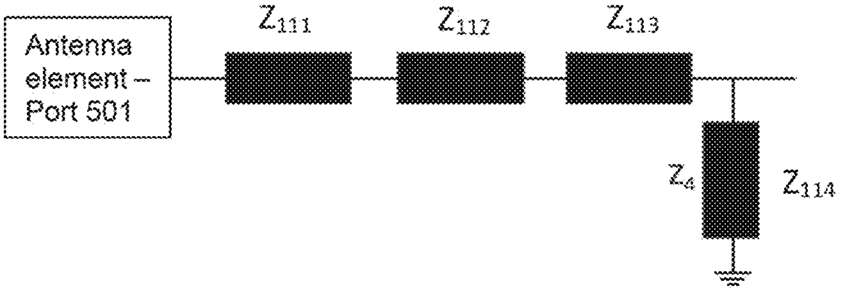
FIG. 11 illustrates at the top a matching network topology used to match the embodiment provided in FIG. 5 and, at the bottom, the values and the part numbers of the components comprised in the matching network presented above.
Figure 12:
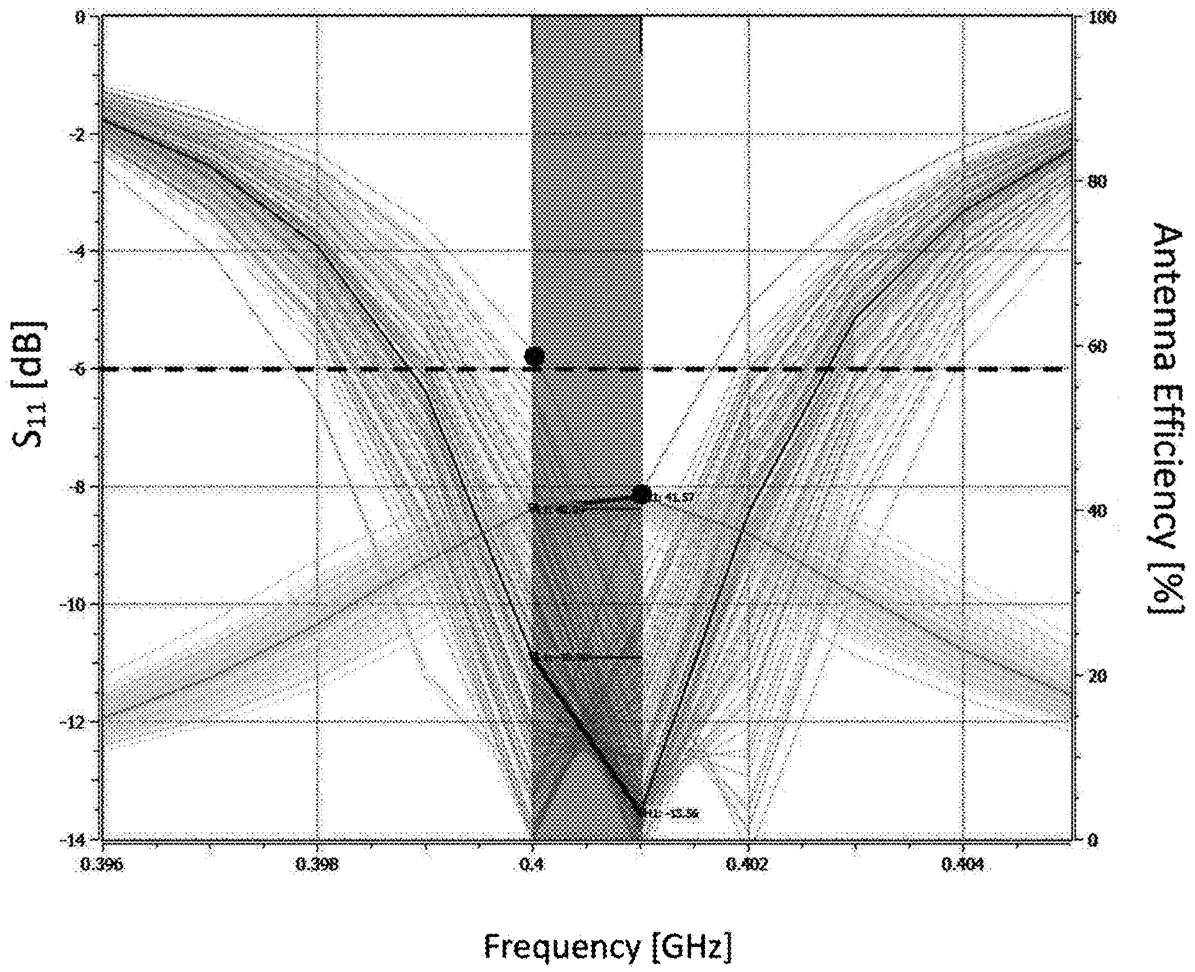
FIG. 12 shows the input reflection coefficient and antenna efficiency obtained for an embodiment like the one from FIG. 5 when it is matched with the matching network provided in FIG. 11.

FIG. 11 provides a matching network topology used for matching the embodiment from FIG. 5 at the port 501 and the components comprised in the matching network. The components values and their corresponding part numbers are also included. The port 502 is connected to a 0 Ohms resistance in order to short-circuit the antenna element to the ground plane layer. A particularity of the matching network from FIG. 11 is that it comprises three initial capacitors connected in series between them, named Z111, Z112 and Z113 in the FIG. 11, and connected to the antenna element instead of having only an initial series capacitor Z71 of a smaller value as it is the case for the matching network provided in FIG. 7. For the particular case of the matching network provided in FIG. 11, the components comprised in are a first series capacitor of 5.7 pF, a second series capacitor of 5.7 pF, a third series capacitor of 5.6 pF and a final parallel capacitor of 30 pF. Having three initial series capacitors connected to the antenna element allows to use capacitors of a higher value and with better tolerances than if you use only one. Then, a better performance in terms of input reflection coefficient is obtained since, as shown with the tolerance analysis—FIG. 12—, an input reflection coefficient below −6 dB is guaranteed, except for a 1% cases for this particular example. In the tolerance analysis from FIG. 12, the performance variation produced by the tolerances in the values of the components comprised in the matching network is shown. The performance parameters provided in the figure are the input reflection coefficient and the antenna efficiency. An antenna efficiency about 40% in the whole band of interest, going from 400 MHz to 401 MHz, is obtained for this particular example.

What is claimed is:

1. A wireless device comprising:

a radiating system that comprises:

a radiating structure including:

a ground plane layer having a clearance area at a corner of a ground plane rectangle, the ground plane rectangle being the minimum-sized rectangle that encompasses the ground plane layer;

an antenna element located in the clearance area; and first and second connections of the antenna element to the ground plane layer, wherein the first and second connections are at opposite corners of the clearance area;

a radiofrequency system including a matching network; and an input/output port, wherein the first connection is connected to the matching network and to the input/output port, and the second connection is a non-driven port with an inductive input impedance.

2. The wireless device of claim 1, wherein the antenna element comprises a radiation booster.

3. The wireless device of claim 1, wherein the antenna element comprises an electrically-small antenna.

4. The wireless device of claim 1, wherein the non-driven port is connected to an electronic circuit that comprises a circuit component.

5. The wireless device of claim 4, wherein the circuit component comprises a passive component.

6. The wireless device of claim 4, wherein the circuit component comprises an active component.

7. The wireless device of claim 1, wherein the non-driven port is connected to a short-circuit.

8. The wireless device of claim 1, wherein the matching network comprises a series capacitor at a beginning of the matching network.

9. The wireless device of claim 1, wherein the matching network comprises first and second series capacitors at a beginning of the matching network.

10. The wireless device of claim 9, wherein the matching network further comprises a parallel capacitor at an end of the matching network.

11. A wireless device comprising:

a radiating system operable in a first frequency region of operation from 400 MHz to 401 MHz, the radiating system comprising:

a radiating structure including:

a ground plane layer having a clearance area at a corner of a ground plane rectangle, the ground plane rectangle being the minimum-sized rectangle that encompasses the ground plane layer of the radiating structure, the ground plane layer having a length and a width smaller than 0.3 times a free-space wavelength corresponding to a lowest frequency of the first frequency region of operation;

an antenna element located in the clearance area and arranged substantially along an edge; and first and second connections of the antenna element to the ground plane layer, wherein the first and second connections are at opposite corners of the clearance area;

a radiofrequency system comprising a matching network; and an input/output port, wherein the first connection is connected to the matching network and to the input/output port, and the second connection is a non-driven port with an inductive input impedance and is connected to a short-circuit.

12. The wireless device of claim 11, wherein the antenna element comprises a radiation booster.

13. The wireless device of claim 11, wherein the antenna element comprises an electrically-small antenna.

14. The wireless device of claim 11, wherein the ground plane layer has a length and a width smaller than 0.2 times the free-space wavelength corresponding to the lowest frequency of the first frequency region of operation.

15. The wireless device of claim 11, wherein the ground plane layer has a length and a width smaller than 0.1 times the free-space wavelength corresponding to the lowest frequency of the first frequency region of operation.

16. The wireless device of claim 11, wherein the matching network comprises a series capacitor at a beginning of the matching network.

17. The wireless device of claim 11, wherein the matching network comprises first and second series capacitors at a beginning of the matching network.

18. The wireless device of claim 17, wherein the matching network further comprises a parallel capacitor at an end of the matching network.

* * * * *